(12) United States Patent
Prange et al.

(10) Patent No.: US 10,290,398 B2
(45) Date of Patent: May 14, 2019

(54) LASER-MARKABLE CABLES AND SYSTEMS FOR MAKING THE SAME

(71) Applicant: GENERAL CABLE TECHNOLOGIES CORPORATION, Highland Heights, KY (US)

(72) Inventors: Mathieu Jean Raymond Prange, Montereau-Fault-Yonne (FR); Jared D. Weitzel, Cincinnati, OH (US); William S. Temple, Loveland, OH (US); Gordon C. Baker, Milford, OH (US); Nathalie Lecourtier, Villeblevin (FR); Sophie Levigoureux, Brunoy (FR); Marjorie Ficquenet, Lieusaint (FR)

(73) Assignee: General Cable Technologies Corporation, Highland Heights, KY (US)

( * ) Notice: Subject to any disclaimer, the term of this patent is extended or adjusted under 35 U.S.C. 154(b) by 0 days.

(21) Appl. No.: 15/436,515

(22) Filed: Feb. 17, 2017

(65) Prior Publication Data
US 2017/0243675 A1    Aug. 24, 2017

Related U.S. Application Data

(60) Provisional application No. 62/297,587, filed on Feb. 19, 2016.

(51) Int. Cl.
*H01B 7/00*    (2006.01)
*H01B 7/36*    (2006.01)
(Continued)

(52) U.S. Cl.
CPC ........... *H01B 7/361* (2013.01); *G02B 6/4416* (2013.01); *G02B 6/4482* (2013.01); *H01B 3/441* (2013.01);
(Continued)

(58) Field of Classification Search
CPC .......... H05K 9/0073; H05K 5/02; H02G 9/00; H02G 9/10; H02G 3/04; H02G 3/06;
(Continued)

(56) References Cited

U.S. PATENT DOCUMENTS 4,808,966 A * 2/1989 Ferlier .................... B44B 7/002
                                                    338/214
4,997,994 A * 3/1991 Andrews ................ B41M 5/267
                                                    174/112
(Continued)

FOREIGN PATENT DOCUMENTS

DE        19849543 A1    4/1999
EP         0710570 A1    5/1996
(Continued)

OTHER PUBLICATIONS

Young, Lee W.; International Search Report and Written Opinion of the International Searching Authority, issued in International Application No. PCT/US2017/018482; dated May 4, 2017; 6 pages.
(Continued)

*Primary Examiner* — Pete T Lee
(74) *Attorney, Agent, or Firm* — Ulmer & Berne LLP

(57) ABSTRACT

Laser-markable cable layers for a cable are provided. The laser-markable cable layers include an inner layer formed of a first polymer material and an outer layer formed of a second polymer material and a laser-marking compound. The outer layer is about 0.5% to about 50% of the thickness of the inner layer. The laser-markable cable layers surround a wire or cable core. Methods of marking a cable having laser-markable cable layers are also provided.

16 Claims, 2 Drawing Sheets

(51) Int. Cl.
*G02B 6/44* (2006.01)
*H01B 3/44* (2006.01)
*H01B 7/02* (2006.01)
*H01B 13/34* (2006.01)

(52) U.S. Cl.
CPC ........... *H01B 7/0216* (2013.01); *H01B 7/365* (2013.01); *H01B 13/348* (2013.01)

(58) Field of Classification Search
CPC . H01H 9/02; H02B 1/50; H01B 17/30; H01B 17/305; H01B 7/0045; H01G 4/224; H01L 23/48; B60R 16/0207; H01R 9/0518; H01R 9/0521; H01R 9/05
See application file for complete search history.

(56) References Cited

U.S. PATENT DOCUMENTS

| | | | |
|---|---|---|---|
| 5,061,341 | A | 10/1991 | Kildal et al. |
| 5,091,284 | A | 2/1992 | Bradfield |
| 5,111,523 | A | 5/1992 | Ferlier et al. |
| 6,370,304 | B1* | 4/2002 | Mills ................. G02B 6/4482 385/114 |
| 6,846,536 | B1* | 1/2005 | Priesnitz ................ H01B 7/361 174/120 C |
| 6,924,077 | B2 | 8/2005 | Delp et al. |
| 7,088,896 | B2 | 8/2006 | Andrieu et al. |
| 8,231,927 | B2 | 7/2012 | Nesbitt et al. |
| 2003/0062190 | A1 | 4/2003 | Kim et al. |
| 2006/0024476 | A1 | 2/2006 | Leland et al. |
| 2009/0200059 | A1* | 8/2009 | Cinquemani .......... H01B 7/189 174/113 R |
| 2010/0112317 | A1 | 5/2010 | Gasworth et al. |
| 2012/0106591 | A1* | 5/2012 | Springer, III ............ G01K 3/04 374/45 |
| 2012/0141752 | A1 | 6/2012 | Wu et al. |
| 2012/0213943 | A1 | 8/2012 | Sarver et al. |
| 2013/0256108 | A1 | 10/2013 | Mahowald et al. |
| 2015/0179307 | A1† | 6/2015 | Kumar |
| 2016/0019997 | A1* | 1/2016 | Adamchuk ............ H01B 3/445 428/220 |

FOREIGN PATENT DOCUMENTS

| | | |
|---|---|---|
| FR | 3054895 A1 | 2/2018 |
| FR | 3054896 A1 | 2/2018 |
| GB | 2421221 A | 6/2006 |

OTHER PUBLICATIONS

Sabreen, Scott R.; "Smart additives" enhance plastics laser marking; Industrial Laser Solutions; Jan. 1, 2012; 6 pages.

Les Cahiers Techniques Des Lasers—Notions de Base du Marquage (The technical specifications of the lasers—basic notions of the marking); Keyence Corporation, 2015; 13 pages including English machine translation.

Guide Technique Sur Les Lasers—Présentation (Technical Guide on Lasers—Presentation); Keyence Corporation, 2015; 15 pages including English machine translation.

\* cited by examiner
† cited by third party

LASER-MARKABLE CABLES AND SYSTEMS FOR MAKING THE SAME

REFERENCE TO RELATED APPLICATIONS

The present application claims the priority benefit of U.S. provisional application Ser. No. 62/297,587, entitled LASER-MARKABLE CABLES AND SYSTEMS FOR MAKING THE SAME, filed Feb. 19, 2016, and hereby incorporates the same application herein by reference in its entirety.

TECHNICAL FIELD

The present disclosure generally relates to laser-markable cables that can have indicia formed thereon using a laser marking system.

BACKGROUND

Wires and cables typically include identifying markings, or indicia, on an outer layer or jacket to provide useful information about the wire or cable. For example, indicia can be provided to convey the type, intended use, wire gauge, certifications of compliance with industry standards such as fire resistance qualifications, length markings, and/or the product number of a cable. Conventional cable marking techniques, such as ink marking systems and hot stamping systems suffer however from relatively slow application times, poor abrasion resistance, and cannot be quickly modified to provide alternative indicia. Consequently, it would be desirable to provide an improved marking system that can quickly apply indicia to a cable and can be quickly adapted to provide alternative indicia.

SUMMARY

In accordance with one embodiment, a cable includes a core and laser-markable cable layers surrounding the core. The laser-markable cable layers include an inner layer and an outer layer. The inner layer is formed from a first polymer material. The outer layer is formed from a second polymer material and a laser-marking compound. The thickness of the outer layer is about 0.5% to about 50% of the thickness of the inner layer.

In accordance with another embodiment, a cable includes a core and laser-markable cable layers surrounding the core. The core includes one or more optical fibers and conductors. The laser-markable cable layers include an inner layer and an outer layer. The inner layer is formed from a first polymer material. The first polymer material includes a polyolefin or polyvinyl chloride ("PVC"). The outer layer is formed from a second polymer material and a laser-marking compound. The thickness of the outer layer is about 0.5% to about 50% of the thickness of the inner layer.

DETAILED DESCRIPTION

An improved system for the formation of markings and indicia on a cable can involve laser-markable cable layers and a laser. The improved system can be used to provide indicia markings on any type of wire or cable through inclusion of the laser-markable cable layers as the outermost layers of any such wire or cable. Non-limiting examples of cables that can include laser-markable cable layers can include indoor cables, outdoor cables, power cables, optical cables, networking cables, and control cables. In such examples, the laser-markable cable layers can exhibit the mechanical and electrical properties expected of cable insulation, coverings, and jackets including desirable durability and ultraviolet ("UV") resistance properties. As can be appreciated, the mechanical and electrical properties of laser-markable cable layers can be varied depending on the type and intended use of a cable. For example, an outdoor cable can include relatively greater durability and/or UV resistance than an indoor cable.

Figure 1:
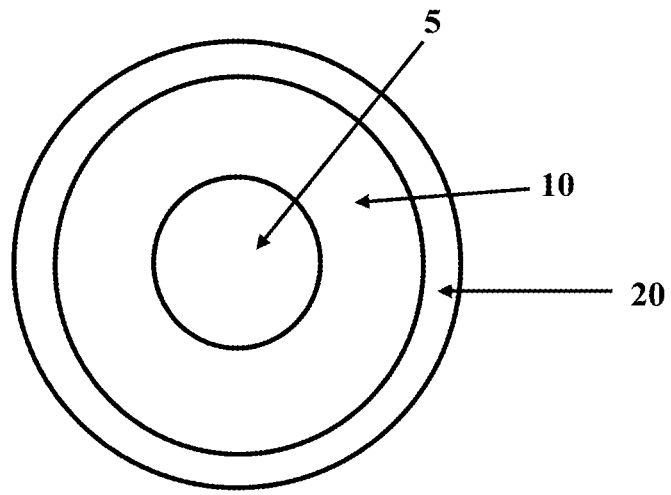
FIG. 1 depicts a cross-sectional view of a cable including laser-markable cable layers according to one embodiment.

According to certain embodiments, suitable laser-markable cable layers can include an inner layer 10 and an outer layer 20. The laser-markable cable layers 10 and 20 can surround a core 5 as depicted in FIG. 1 to form a laser-markable cable. The core 5 can include one or more conductive elements or optical elements (not depicted). In certain embodiments, the core 5 can be a hybrid core including both conductive elements and optical elements.

An inner layer can provide mechanical strength to the laser-markable cable layers while an outer layer can act as a laser-markable skin layer and can include a laser-marking compound. The two layers can be co-extruded and can collectively act as a traditional jacket layer in certain embodiments while also offering the desired laser-marking characteristics for a laser-marking system described herein. As can be appreciated, it can be advantageous for the outer layer to be as thin as possible so as to minimize the use of the laser-marking compound.

An inner layer, providing mechanical strength to the laser-marking cable layers, can be formed of any suitable material that exhibits adequate strength, flexibility, and durability. For example, an inner layer can be formed of a polyolefin base polymer such as polyethylene (including low-density polyethylene ("LDPE"), medium-density polyethylene ("MDPE"), high-density polyethylene ("HDPE")), polypropylene, or the like, or combinations thereof. Alternatively, the inner layer base polymer can be polyvinyl chloride ("PVC") or any other low-smoke zero halogen material. The thickness of the inner layer can be varied depending on, for example, the selection of the base polymer, the performance of the outer, laser-markable, layer, and the expected cable use.

An outer layer can be formed of any suitable polymer that is compatible with the base polymer of the inner layer. As used herein, compatible can mean that the materials adhere to one another without undergoing any adverse or detrimental reactions. Examples of such polymer materials can include polyolefins, including the polyolefins suitable for the inner layer, as well as PVC. In certain embodiments, an outer layer can alternatively be formed of, or additionally include, a coating layer formed from an acrylic resin, a urethane resin, or other similar resin. In certain embodiments, it can be useful for the base polymer of both the inner layer and the outer layer to be identical or otherwise substantially compatible.

Laser-marking functionality can be incorporated into the outer layer through inclusion of a suitable laser-marking compound. Generally, suitable laser-marking compounds can include any compound that improves the ability of an outer layer including such a compound to be marked with a laser as compared to a similar outer layer free of such a compound. As can be appreciated, there are multiple types of suitable laser-marking compounds. For example, suitable laser-marking compounds can include compounds which at least partially ablate an outer layer when exposed to laser energy, compounds which convert laser energy to heat to cause burning or carbonization of an outer layer, compounds which foam or expand when exposed to laser energy, and compounds which change color when exposed to laser energy. As can be appreciated, various compounds can impart such effects to the outer layer by using the applied laser energy to generate heat or drive certain chemical reactions.

In certain embodiments, for example, suitable laser-marking compounds can be thermochromic compounds. Thermochromic compounds, such as certain metal oxides and certain inorganic additives, are compounds which can undergo color changes when exposed to the energy of a laser or laser pulse. Examples of thermochromic compounds include metal oxides such as titanium dioxide, antimony trioxide, and iron oxide.

In certain embodiments, a laser-marking compound, such as a thermochromic compound, can also exhibit additional color changing properties in response to different thermal profiles. In such embodiments, the laser-marking compound can exhibit a first color in response to a laser emission or laser pulse, and one or more additional colors in response to other temperatures such as temperatures caused by excessive cable heating. As can be appreciated, laser-markable cable layers including such laser-marking compounds can exhibit several advantages. For example, multi-colored indicia can be formed by varying the characteristics such as wavelength and intensity imparted to a laser-markable cable layer by a laser system.

Additionally, or alternatively, such laser-markable cable layers can also exhibit information about the temperature of a cable during operating conditions. For example, in certain embodiments, a laser-markable cable layer can shift to one or more additional colors when exposed to unsafe operating temperatures either due to internal or external heating of the cable. Such color shifts can serve as a visual warning that unsafe operating conditions have been reached. As can be appreciated, the color shifts can be permanent or reversible in various embodiments.

In certain embodiments, laser-markability can be provided to an outer layer through inclusion of a laser-marking compound which can cause partial or full ablation of the outer layer. In such embodiments, exposure to the energy of a laser emission or a laser pulse can ablate portions of the outer layer to cause a void or discontinuity in the outer layer. Such ablation can expose the underlying inner layer. As can be appreciated, the resulting voids can directly form visible indicia (e.g., in embodiments where the outer layer and the inner layer exhibit contrasting colors) or can form indicia when such voids are filled with a contrasting color agent such as a colored wax. As can be further appreciated, the laser-markable cable layers as described herein can be particularly useful for such ablative techniques because the inclusion of a relatively thick inner layer can prevent the laser system from damaging any underlying cable components. In certain embodiments, the depth of the laser ablation can be about 50%, or more, of the thickness of the outer layer, in certain embodiments, about 70%, or more, of the thickness of the outer layer, and in certain embodiments, about 90%, or more, of the thickness of the outer layer.

As can be appreciated, laser-marking compounds can be selective to particular laser wavelengths. Suitable laser-marking compounds can be selected based on the laser system used to mark the outer layer of the cables described herein. For example, in certain embodiments, the laser-marking compounds can be sensitive to laser energy having a wavelength of about 1060 nm to about 1070 nm.

As can be appreciated, suitable laser-marking compounds can be commercially obtained in certain embodiments. For example, CESA® laser products from Clariant SE and certain products from Treffert GmbH & Co. KG can act as suitable laser-marking compounds. As can be appreciated, such laser-marking compounds can be provided as a masterbatch in a suitable polymer such as polyethylene. In such embodiments, a masterbatch can, for example, include about 10% to about 40% of a suitable laser-marking compound.

By weight percentage, the total amount of a laser-marking compound in an outer layer can vary. For example, in certain embodiments, the outer layer can include about 0.05% to about 5% of a laser-marking compound; and in certain embodiments the outer layer can include about 0.2% to about 1.5% of a laser-marking compound. As can be appreciated however, the weight percentage of a laser-marking compound can vary depending on aspects such as the intensity of the laser, the thickness of the outer layer, the desired line speed, and the selected laser-marking compound. In certain embodiments, inclusion of insufficient quantities of a laser-marking compound can result in laser-markable cable layers that do not exhibit sufficient changes to contrast or color after exposure to a laser. In certain embodiments, excessive quantities of a laser-marking compound in contrast, may undesirably color the laser-markable cable layers. Suitable amounts of a laser-marking compound can allow the laser-markable cable layers to produce readily observable indicia that are distinguishable in both color and contrast from unmarked portions of the laser-markable cable layers. According to certain embodiments, reduction in laser intensity, increased line speeds, and decreased thicknesses of the outer layer may necessitate relatively greater quantities of a laser-marking compound.

In certain embodiments, an inner layer and/or an outer layer can also include additional components such as an antioxidant, a UV stabilizer, a light stabilizer, a heat stabilizer, a lead stabilizer, and a metal deactivator to improve the stability or properties of a layer. In certain embodiments, a layer can include one or more of such additional components.

According to certain embodiments, suitable antioxidants for a laser-markable cable layer can include amine-antioxidants, such as 4,4'-dioctyl diphenylamine, N,N'-diphenyl-p-phenylenediamine, and polymers of 2,2,4-trimethyl-1,2-dihydroquinoline; phenolic antioxidants, such as thiodiethylene bis[3-(3,5-di-tert-butyl-4-hydroxyphenyl) propionate], 4,4'-thiobis(2-tert-butyl-5-methylphenol), 2,2'-thiobis(4-methyl-6-tert-butyl-phenol), benzenepropanoic acid, 3,5-bis(1,1-dimethyl ethyl)4-hydroxy benzenepropanoic acid, 3,5-bis(1,1-dimethyl ethyl)-4-hydroxy-C13-15 branched and linear alkyl esters, 3,5-di-tert-butyl-4hydroxy-hydrocinnamic acid C7-9-branched alkyl ester, 2,4-dimethyl-6-t-butylphenol tetrakis{methylene-3-(3',5'-ditert-butyl-4'-hydroxyphenol)propionate}methane or tetrakis {methylene3-(3',5'-ditert-butyl-4'-hydrocinnamate}methane, 1,1,3tris(2-methyl-4-hydroxyl-5-butylphenyl)butane, 2,5,di t-amyl hydroquinone, 1,3,5-tri methyl2,4,6tris(3,5di tert butyl-4-hydroxybenzyl)benzene, 1,3,5tris(3,5di-tert-butyl-4-hydroxybenzyl)isocyanurate, 2,2-methylene-bis-(4-methyl-6-tert butyl-phenol), 6,6'-di-tert-butyl-2,2'-thiodi-p-cresol or 2,2'-thiobis(4-methyl-6-tert-butylphenol), 2,2-ethylenebis(4,6-di-t-butylphenol), triethyleneglycol bis{3-(3-t-butyl-4-hydroxy-5methylphenyl) propionate}, 1,3,5-tris(4tert-butyl-3-hydroxy-2,6-dimethylbenzyl)-1,3,5-triazine-2,4,6-(1H,3H,5H)trione, 2,2-methylenebis{6-(1-methylcyclohexyl)-p-cresol}; and/or sulfur antioxidants, such as bis(2-methyl-4-(3-n-alkylthio-propionyloxy)-5-t-butylphenyl)sulfide, 2-mercaptobenzimidazole and its zinc salts, pentaerythritol-tetrakis(3-lauryl-thiopropionate), and combinations thereof.

Suitable UV stabilizers for a laser-markable cable layer can be selected from compounds including: benzophenones, triazines, banzoxazinones, benzotriazoles, benzoates, formamidines, cinnamates/propenoates, aromatic propane-diones, benzimidazoles, cycloaliphatic ketones, formanilides, cyanoacrylates, benzopyranones, salicylates, and combinations thereof. Specific examples of UV stabilizers can include 2,2"-methylenebis(6-(2H-benzotriazol-2-yl)-4-4(1,1,3,3,-tetramethylbutyl) phenol, available as LA-31 RG from Adeka Palmarole (Saint Louis, France) having CAS #103597-45-1; and 2,2'-(p-phenylene) bis-4-H-3,1-benzoxazin-4-one, available as Cyasorb UV-3638 from Cytec Industries (Stamford, Conn.) and having CAS #18600-59-4. As can be appreciated, carbon black can also be included in a laser-markable cable layer to provide UV resistance.

Hindered amine light stabilizers ("HALS") can be used as a light stabilizer according to certain embodiments. HALS can include, for example, bis(2,2,6,6-tetramethyl-4-piperidyl)sebaceate; bis(1,2,2,6,6-tetramethyl-4-piperidyl)sebaceate with methyl 1,2,2,6,6-tetrameth-yl-4-piperidyl sebaceate; 1,6-hexanediamine, N,N'-bis(2,2,6,6-tetramethyl-4-piperidyl)polymer with 2,4,6 trichloro-1,3,5-triazine; reaction products with N-butyl2,2,6,6-tetramethyl-4-piperidinamine; decanedioic acid; bis(2,2,6,6-tetramethyl-1-(octyloxy)-4-piperidyl)ester; reaction products with 1,1-dimethylethylhydroperoxide and octane; triazine derivatives; butanedioc acid; dimethylester, polymer with 4-hydroxy-2,2,6,6-tetramethyl-1-piperidine ethanol; 1,3,5-triazine-2,4,6-triamine,N,N'''-[1,2-ethane-diyl-bis[ [ [4,6-bis-[butyl (1,2,2,6,6pentamethyl-4-piperdinyl)amino]-1,3,5-triazine-2-yl]imino-]-3,1-propanediyl]]bis[N',N''-dibutyl-N',N''bis(2,2,6,6-tetramethyl-4-pipe-ridyl); bis (1,2,2,6,6-pentamethyl-4-piperidinyl) sebacate; poly[[6-[(1,1,3,3-terramethylbutyl)amino]-1,3,5-triazine-2,4-diyl][2,2,6,6-tetramethyl-4-piperidinyl)imino]-1,6-hexanediyl[(2,2,6,6-tetramethyl-4-piperidinyl)imino]]; benzenepropanoic acid; 3,5-bis(1,1-dimethyl-ethyl)-4-hydroxy-C7-C9 branched alkyl esters; and isotridecyl-3-(3,5-di-tert-butyl-4-hydroxyphenyl) propionate. In one embodiment, a suitable HALS can be bis(1,2,2,6,6-pentamethyl-4-piperidinyl) sebacate.

A suitable heat stabilizer can be selected from, but is not limited to, 4,6-bis (octylthiomethyl)-o-cresol dioctadecyl 3,3'-thiodipropionate; poly[[6-[(1,1,3,3-terramethylbutyl)amino]-1,3,5-triazine-2,4-diyl][2,2,6,6-tetramethyl-4-piperidinyl)imino]-1,6-hexanediyl[(2,2,6,6-tetramethyl-4-piperidinyl)imino]]; benzenepropanoic acid; 3,5-bis(1,1-dimethyl-ethyl)-4-hydroxy-C7-C9 branched alkyl esters; and isotridecyl-3-(3,5-di-tert-butyl-4-hydroxyphenyl) propionate. According to some embodiments, the heat stabilizer can be 4,6-bis (octylthiomethyl)-o-cresol; dioctadecyl 3,3'-thiodipropionate and/or poly[ [6-[(1,1,3,3-terramethylbutyl) amino]-1,3,5-triazine-2,4-diyl][2,2,6,6-tetramethyl-4-piperidinyl)imino]-1,6-hexanediyl[(2,2,6,6-tetramethyl-4-piperidinyl)imino]].

A suitable lead stabilizer can be lead oxide, such as for example, red lead oxide $Pb_3O_4$. However, as will be appreciated, any other suitable lead stabilizer can also be used alone or in combination with red lead oxide. In certain embodiments, however, the laser-markable cable layers can alternatively be substantially lead-free. As will be appreciated, lead-free compositions can be advantageous for safety reasons and can allow for wider usage of the laser-markable systems described herein.

Suitable metal deactivators can include, for example, N,N'-bis(3-(3,5-di-t-butyl-4-hydroxyphenyl)propionyl)hydrazine, 3-(N-salicyloyl)amino-1,2,4-triazole, and/or 2,2'-oxamidobis-(ethyl 3-(3,5-di-t-butyl-4-hydroxyphenyl)propionate).

Alternatively, or additionally, a colorant such as carbon black, cadmium red, or iron blue can be included in a laser-markable cable layer to provide color and potentially UV protection. Generally, any colorant compatible with the base polymer of a laser-markable cable layer can be used.

The use of multiple layers in a laser-markable system allows for several additional advantages. For example, in certain embodiments, the amount of a laser-marking compound can be reduced by including such compounds only in a relatively thin outer layer while still allowing the laser-markable cable layers to exhibit the expected mechanical and protective properties of a typical cable jacket. In certain embodiments, the outer layer can have a thickness of about 0.5% to about 50% of the thickness of the inner layer; in certain embodiments, the outer layer can have a thickness of about 0.5% to about 20% of the inner layer; and in certain embodiments, the outer layer can have a thickness of about 0.5% to about 10% of the inner layer.

Figure 2:
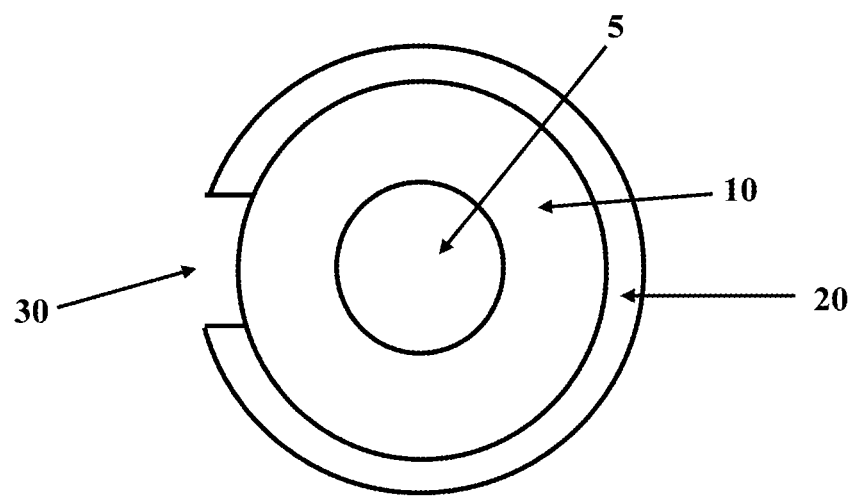
FIG. 2 depicts a cross-sectional view of a cable including laser-markable cable layers having a stripe according to one embodiment.
Figure 3:
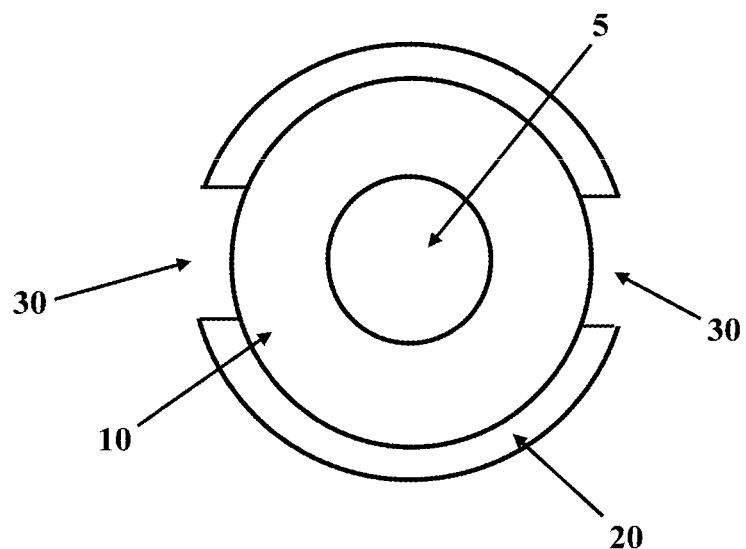
FIG. 3 depicts a cross-sectional view of a cable including laser-markable cable layers having multiple stripes according to one embodiment.

The use of multiple layers can also allow laser-markable cable layers to exhibit additional features such as stripes. Stripes can be formed by including a circumferential gap or discontinuity in an outer layer. As depicted in FIG. 2, when the inner layer 10 and the outer layer 20 are present, a circumferential gap or discontinuity 30, such as one created by, for example, laser ablation, in the outer layer 20 can expose the underlying inner layer 10 to create a visible stripe. As can be appreciated, multiple stripes can be formed through inclusion of multiple discontinuities 30 in the outer layer 20 as depicted in FIG. 3. When highly visible stripes are desired, the inner layer and the outer layer can be formed in contrasting colors. As can be appreciated, the stripes can be formed having a variety of configurations, including being either longitudinal or helical. If multiple stripes are included, a combination of helical and longitudinal stripes can also be formed. As can be appreciated, the circumferential gaps or discontinuities can be filled with material in certain embodiments. For example, a gap or discontinuity can be filled with a composition similar to an outer layer of a laser-markable cable layer system as described herein.

As can be appreciated, stripes can include a laser-marking compound in certain embodiments. For example, one or more temperature-sensitive stripes can be included to exhibit information such as the conductor temperature, the environment temperature, or laser-marked indicia. Temperature-sensitive stripes can exhibit multiple colors through inclusion of a suitable laser-marking compound. In certain embodiments, a cable can include one or more temperature-sensitive stripes in addition to one or more non temperature-sensitive stripes.

Figure 4:
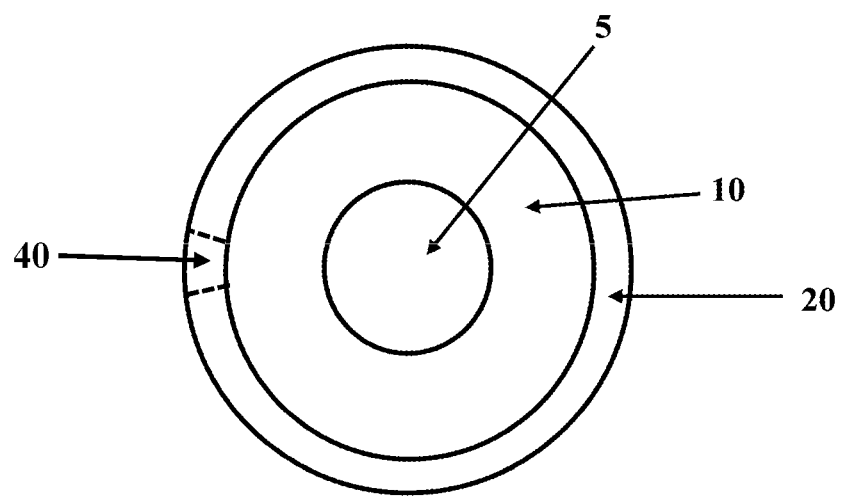
FIG. 4 depicts a cross-sectional view of a cable including an integrally-formed laser-markable strip in an outer layer according to one embodiment.

In certain embodiments, an outer layer can be modified to allow for a further reduction in the use of laser-marking compounds. For example, an outer layer can include a laser-marking compound only in one or more integrally formed stripes, or sections, of the outer layer. In such embodiments, the remainder of the outer layer can be substantially free of laser-marking compounds. Outer layers having such integrally formed thermochromic stripes can be formed by incorporating a laser-marking compound into the outer layer substantially during, or subsequent to, the extrusion of the outer layer. For example, a laser-marking compound can be injected into a hot outer layer at the time of extrusion. In other examples, a thermochromic strip can also be incorporated into an outer layer by heating the outer layer and injecting a laser-marking compound into the outer layer or by filling in gaps or discontinuities in the outer layer with a laser-marking compound. FIG. 4 depicts a cross-sectional view of a cable including a single integrally formed thermochromic strip 40 in the outer layer 20 of a cable. Similar cables can be formed incorporating two or more such strips or sections.

As can be appreciated, laser-markable cable layers as described herein can also optionally include additional layers. For example, certain systems can further include a protective layer surrounding the laser-markable outer layer. In such embodiments, the protective layer can be at least partially transparent to allow for both observation of any underlying indicia and for formation of indicia on the underlying outer layer with a laser. Other layers that can optionally be included can include additional mechanical strength layers, compatibility layers for improved adhesion with an underlying cable core, and colored layers useful in the formation of multi-colored stripes.

Alternatively, laser-markable cable systems as described herein can include only a single layer which includes a laser-marking compound. Such single-layered cable layers can be useful for micro-module cables which do not require the mechanical or electrical properties of a multi-layer system. In certain embodiments, cables having a diameter of about 10 mm or less can include a laser-markable cable formed of a single layer including a laser-marking compound.

A laser system can be used to bring out, or form, the desired indicia on the laser-markable cable layers. The laser system provides focused energy to form such desired indicia on the laser-markable cable layers. Generally, any laser system can be suitable including for example, computer controlled hybrid, fiber, neodymium-doped yttrium orthovanadate ("YVO4"), carbon dioxide, and neodymium-doped yttrium aluminum garnet ("YAG") laser systems. Such lasers can be continuously emitted or can be pulsed to generate focused energy on a laser-markable layers cable and can be controlled to form precise indicia under the control of a computer system. Commercial laser marking systems such as those from Keyence Corp. can generally be useful for the application of indicia as known in the art.

As can be appreciated, selection of the laser's wavelength, intensity, and pulse characteristics can influence the selection of laser-marking compounds in the outer layer as well as the line speed of the cable. Suitable laser systems can enable the formation of indicia on a laser-markable cable at line speeds of about 50 m/min to about 150 m/min in certain embodiments, at line speeds of about 70 m/min to about 120 m/min in certain embodiments, or line speeds of about 100 m/min in certain embodiments.

As can be appreciated, the appearance of the indicia can be influenced through selection of the laser-marking compound, other components in the inner layer and the outer layer, and characteristics of the laser such as wavelength and intensity. For example, in certain embodiments, white or substantially white indicia can be formed on a dark, or black, cable layer using, for example, inorganic additive based thermochromic compounds. In other certain embodiments, dark indicia can be formed on white, or lighter-colored, cables using, for example, antimony trioxide based thermochromic compounds. As can be appreciated however, other colors and color combinations are also possible including colors outside of human-viewable wavelengths, such as ultraviolet colors.

As used herein, indicia can mean any human or machine-readable text, symbols, markings, or combinations thereof. For example, a suitable set of indicia could include both a string of text and a UL registration or certification symbol. Generally any marking that can be printed in 2-dimensions can be produced using the laser marking system as described herein. For example, 1-dimensional and 2-dimensional barcodes can be produced in certain embodiments. Additionally, or alternatively, markings such as length (in any suitable unit system such as metric or imperial) can be applied to a cable. As can be appreciated, indicia can be continuously applied along the length of a cable. For example, indicia can repeat after a predetermined spacing. As can be further appreciated however, the use of a laser system can also allow the indicia to be modified along the length of the cable. For example, indicia can include the cumulative length of a cable in certain embodiments.

As can be appreciated, indicia can be applied to a cable at any time using a suitable laser. For example, indicia can be applied by a cable manufacturer before being sold or can be applied by an end-user before or after installation.

The inner and outer layers can be formed by blending the components/ingredients of each layer in conventional masticating equipment such as, for example, a rubber mill, brabender mixer, banbury mixer, Buss Ko-Kneader, farrel continuous mixer, or twin screw continuous mixer. The components can be premixed before addition to the base polymer (e.g., polyolefin or PVC). The mixing time can be selected to ensure a homogenous mixture.

Once mixed, the inner layer and the outer layer can be extruded. In a typical extrusion method, an optionally heated cable core can be pulled through a heated extrusion die, generally a cross-head die, to apply a layer of melted composition onto the cable core. Multiple layers can be applied by consecutive extrusion steps in which an additional layer is added in each step, or with the proper type of die, multiple polymer layers may be co-extruded simultaneously.

Alternatively, the outer layer can be applied as a coating composition. The use of a coating composition formed of, for example, an acrylic resin or urethane resin, can facilitate the formation of a thinner outer layer having improved bonding to the inner layer. As can be appreciated, a coating composition can be applied as known in the art. For example, a coating composition can be applied using a pressurized spray gun, a dipping operation, a brush, or a roller in various embodiments.

EXAMPLES

Table 1 depicts two example outer layers of laser-markable cable layers. As can be appreciated, laser-markable stripes can be formed of similar Example materials. Example 1 includes a commercially supplied antimony trioxide thermochromic compound that forms dark markings upon exposure to laser-applied heat. Example 1 further includes a colorant masterbatch. Example 2 includes a commercially supplied inorganic additive based thermochromic compound that forms light markings upon exposure to laser-applied heat. The thermochromic compound in each Example was dispersed in a polyethylene masterbatch. The Examples exhibited excellent indicia formation at line speeds of about 50 m/min to about 60 m/min.

TABLE 1

| Component | Example 1 | Example 2 |
|---|---|---|
| Base Polymer | Halogen-free flame retardant polymer (93% to 94%) | HDPE (98% to 99%) |
| Thermochromic Compound Masterbatch in polyolefin (weight percentage) | 3% to 4% CESA ®-Laser PEA0132098 from Clariant | 1% to 2% HT-MAB PE 91145 LSM from Treffert GmbH & Co. KG. |
| Colorant Masterbatch in polyolefin | 2% or 3% RD PE from PolyOne Corp. | — |
| Effect of Laser Exposure On Outer Layer | Turns dark (layer has a light background prior to exposure) | Turns light (layer has a dark background prior to exposure) |

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A cable comprising:
   a core; and
   laser-markable cable layers surrounding the core, the laser-markable cable layers comprising:
      an inner layer formed from a first polymer material, wherein the first polymer material comprises polyethylene; and
      an outer layer formed from a second polymer material and a laser-marking compound, wherein the second polymer material comprises polyvinyl chloride ("PVC"), and wherein the outer layer includes about 0.05% to about 5% of a laser-marking compound; and
   wherein the thickness of the outer layer is about 0.5% to about 50% of the thickness of the inner layer; wherein the laser-marking compound at least partially ablates the outer layer upon exposure to the energy of a laser, and wherein the depth of the ablation is about 50% or more of the thickness of the outer layer.

2. The cable of claim 1, wherein the core comprises one or more optical fibers and conductors.

3. The cable of claim 1, wherein the laser-marking compound comprises a metal oxide.

4. The cable of claim 3, wherein the metal oxide comprises one or more members of the group including titanium dioxide, iron oxide, and antimony trioxide.

5. The cable of claim 1, wherein the laser-marking compound comprises an inorganic compound.

6. The cable of claim 1, wherein the laser-marking compound visually exhibits a first color when incorporated into the outer layer and visually exhibits a second color after exposure to a first elevated temperature.

7. The cable of claim 6, wherein the first elevated temperature is generated by a laser pulse.

8. The cable of claim 6, wherein the laser-marking compound visually exhibits one or more additional colors different from the first and second colors, each of the one or more additional colors visually exhibited after exposure to a temperature different from the first elevated temperature.

9. The cable of claim 1, wherein the laser-marking compound comprises a thermochromic compound.

10. The cable of claim 1, wherein the outer layer further comprises one or more of carbon black, an antioxidant and a UV stabilizer.

11. The cable of claim 1, wherein the first polymer material further comprises PVC.

12. The cable of claim 1, wherein the outer layer includes one or more discontinuous gaps.

13. The cable of claim 1, wherein the laser-markable cable layers comprise a longitudinal stripe.

14. The cable of claim 1, wherein the laser-marking compound is located in an integrally-formed laser-markable strip or section.

15. A cable comprising:
   a core comprising one or more optical fibers and conductors; and
   laser-markable cable layers surrounding the core, the laser-markable cable layers comprising:
      an inner layer comprising a first polymer material, wherein the first polymer material comprises polyethylene; and
      an outer layer comprising a second polymer material and a laser-marking compound, wherein the second polymer material comprises polyvinyl chloride ("PVC"), and wherein the outer layer includes about 0.05% to about 5% of a laser-marking compound; wherein the thickness of the outer layer is about 0.5% to about 50% of the thickness of the inner layer; and wherein the outer layer includes one or more discontinuous gaps.

16. The cable of claim 15, wherein the inner layer and the outer layer are extruded.

* * * * *